(12) United States Patent
Inan et al.

(10) Patent No.: US 11,836,687 B2
(45) Date of Patent: Dec. 5, 2023

(54) WASTE MEASUREMENT AND TRACKING SYSTEM

(71) Applicant: FFPS BILGI TEKNOLOJILERI DANIS-MANLIK DIS TICARET VE EGITIM HIZMETLERI SAN, VE TIC, LTD. STI, Konya (TR)

(72) Inventors: Murat Inan, Konya (TR); Suleyman Tunc, Konya (TR)

(73) Assignee: FFPS BILGI TEKNOLOJILERI DANIS-MANLIK DIS TICARET VE EGITIM HIZMETLERI SAN, VE TIC, LTD. STI, Konya (TR)

(*) Notice: Subject to any disclaimer, the term of this patent is extended or adjusted under 35 U.S.C. 154(b) by 469 days.

(21) Appl. No.: 16/816,426

(22) Filed: Mar. 12, 2020

(65) Prior Publication Data

US 2020/0242568 A1    Jul. 30, 2020

Related U.S. Application Data

(63) Continuation of application No. 15/106,547, filed as application No. PCT/TR2014/000498 on Dec. 10, 2014, now abandoned.

(30) Foreign Application Priority Data

Dec. 20, 2013   (TR) ................................ 2013/15018

(51) Int. Cl.
*G06Q 10/00*   (2023.01)
*G06Q 10/30*   (2023.01)
*G06Q 10/0833*   (2023.01)
*H04L 69/40*   (2022.01)
*B65F 1/14*   (2006.01)
(Continued)

(52) U.S. Cl.
CPC ......... *G06Q 10/30* (2013.01); *G06Q 10/0833* (2013.01); *H04L 69/40* (2013.01); *B65F 1/1484* (2013.01); *B65F 2210/128* (2013.01); *B65F 2210/168* (2013.01); *B65F 2210/182* (2013.01); *B65F 2210/20* (2013.01); *G01F 23/802* (2022.01); *G01N 27/02* (2013.01); *Y02W 90/00* (2015.05)

(58) Field of Classification Search
CPC ........ F23G 5/006; B65F 1/1405; B65F 1/062; B65F 2210/128; B65F 2210/168; B65F 2210/182; B65F 2210/20; B65F 1/1484; B30B 9/3007; G08B 13/22; G06Q 10/30; G06Q 10/0832; Y02W 90/00; G01N 27/02; G01F 23/2962; G01F 23/802; H04L 69/40
See application file for complete search history.

(56) References Cited

U.S. PATENT DOCUMENTS 5,173,866 A * 12/1992 Neumann ............. B30B 9/3007
                                                              414/525.2
5,425,316 A *  6/1995 Malone ................... F23G 5/006
                                                              110/190
(Continued)

*Primary Examiner* — Tuan A Vu
(74) *Attorney, Agent, or Firm* — Bayramoglu Law Offices LLC

(57) ABSTRACT

Invention is about a measurement and tracking system for providing the periodical waste collection service on the right time in the large cities. And it is also about for the quick intervention in negative situations in the waste container.

10 Claims, 3 Drawing Sheets

(51) Int. Cl.
    *G01N 27/02*     (2006.01)
    *G01F 23/80*     (2022.01)

(56) References Cited

U.S. PATENT DOCUMENTS

| | | | |
|---|---|---|---|
| 2005/0035769 A1* | 2/2005 | Otto | G01F 23/2962 324/644 |
| 2005/0080520 A1* | 4/2005 | Kline | B65F 1/062 701/1 |
| 2007/0101875 A1* | 5/2007 | Poss | B65F 1/1405 100/229 A |
| 2014/0180953 A1* | 6/2014 | Westcott | G06Q 10/0832 705/332 |
| 2014/0326066 A1* | 11/2014 | Mears | G01F 23/802 73/304 C |
| 2015/0297778 A1* | 10/2015 | Conroy | G08B 13/22 239/11 |
| 2016/0300297 A1* | 10/2016 | Kekalainen | B65F 1/1484 |
| 2016/0320438 A1* | 11/2016 | Donnangelo | G01N 27/02 |
| 2017/0195897 A1* | 7/2017 | Lopes | H04L 69/40 |

\* cited by examiner

WASTE MEASUREMENT AND TRACKING SYSTEM

CROSS REFERENCE TO THE RELATED APPLICATIONS

This application is a continuation application of International Application No. PCT/TR2014/000498, filed on Dec. 10, 2014, which is based upon and claims priority to Turkish Patent Application No. 2013/15018, filed on Dec. 20, 2013, the entire contents of which are incorporated herein by reference.

TECHNICAL FIELD

Invention is about a measurement and tracking system for providing the periodical waste collection service on the right time in the large cities. And it is also about for the quick intervention in negative situations in the waste container.

BACKGROUND

Waste containers provide easiness in the waste collecting business. Bigger containers inserted underground are started to be preferred against to small containers based upon the common studies in those days. To those containers, collection service is given on daily, once in two days or weekly period by the municipalities. In some areas and on some periods, if the waste container is full before the collection service period comes because of the high amount of waste, spread of the waste can cause health problems and visual pollution. Another situation is about the raising cost that municipalities have to carry because of the given collection service before the waste container gets full. The security of the containers is very important for the environment. Because environmental harm caused by a fire is a common problem which is started in the container. Besides, it is important to take precautions for gas pressures, physical, chemical, biological threads and similar dangers.

SUMMARY

In those days, the security of the containers which produced as smart container are provided with the security cameras. Besides, the weight change of the container is used in the determination of the fullness of the container. However, there is not a total security assurance because of the cameras do not have warning function. Total security can only be provided with a non-stop observing service for the security cameras. Even if it is provided, unfortunately, the gas pressure in the container cannot be determined with this way. The weight control cannot provide a successful result because mostly the volume of the objects are not directly proportional to their weights.

Invention depends on a calculation system of the empty area in the container by the ultrasonic laser and the other distance sensors. The system spots the top level of the wastes in the container, placed from bottom to top, and regarding to that spot calculates the empty area. Besides it also determines the factors like dangerous gas and temperature by the sensors. The energy that is needed for the sensors can be provided by the batteries which can be chargeable by the solar power. Also location determination and service planning can be done with the GPS.

For the containers that are placed nearly, we can make the other containers send data through a single container by a paid communication line, such as GSM. In other words, as a client logic, if there is a group of devices, they can send data to headquarters by connecting wirelessly to the device which has a modem on it.

Poisonous gases that need urgent intervention and society health, radioactive material or wastes, biological materials, wastes that spread unpleasant fragrances to the surround are determined by the sensors and the headquarters are notified about them. With that notification, the container is provided to get the service immediately.

DESCRIPTION OF THE REFERENCE NUMERALS

Figure 1:
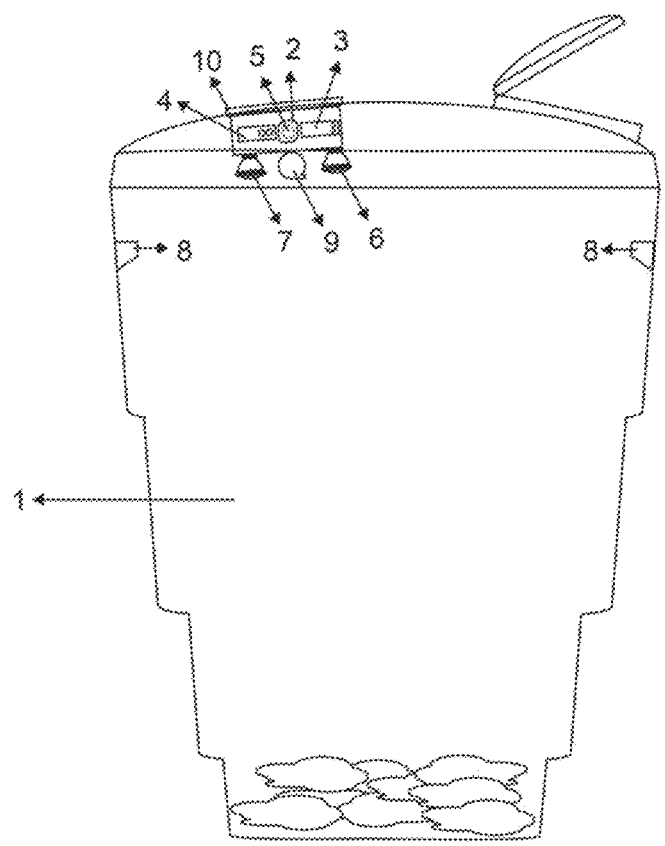
FIG. 1. General View of the Container
FIG. 2. General View of the Sensor System
FIG. 3. The View of the Parts of the Communication System
FIG. 4. The View of the Communication System
FIG. 5. The Diagram of the Process of the System
Figure 2:
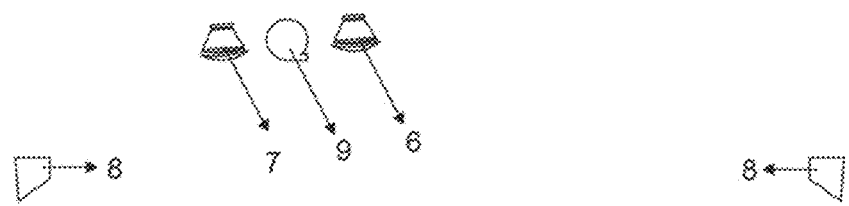
Figure 3:
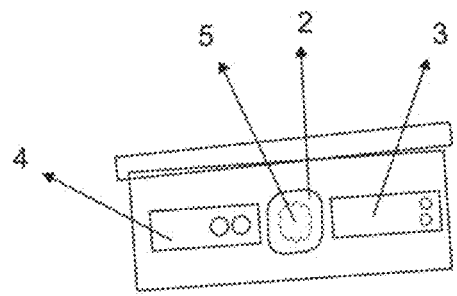
Figure 4:
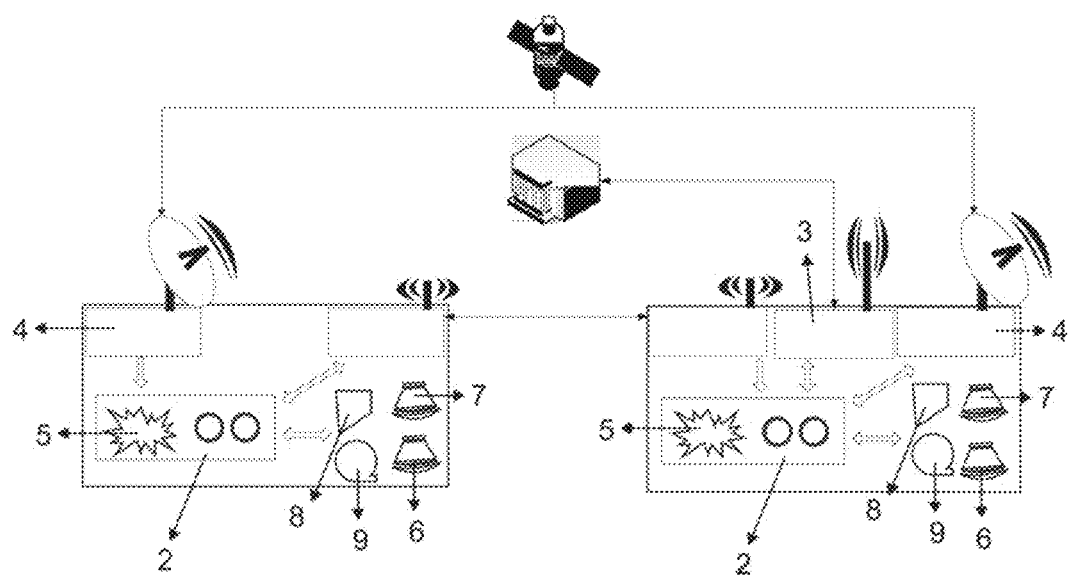
Figure 5:
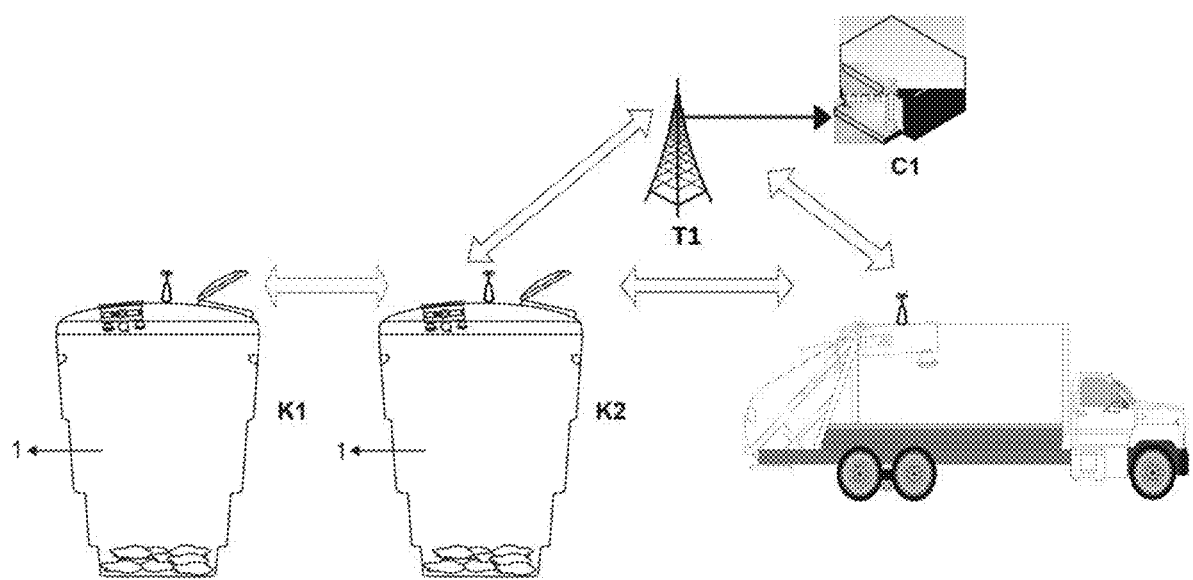

1. Container
2. Processor
3. Modem
4. GPS Modem
5. Software
6. Poisonous Gas Sensor
7. Fragrance Sensor
8. Volume-Distance Sensor
9. Other Sensors (Radioactivity, Biological, Physical (Heat etc.), Chemical)
10. Battery

DETAILED DESCRIPTION OF THE EMBODIMENTS

Invention consists of a processor (2) which is placed in a container (1), a control and communication unit which includes a modem (3), a GPS Modem (4), a software (5), and a measurement unit which includes a poisonous gas sensor (6), a fragrance sensor (7), a volume-distance sensor (8) and other sensors (Radioactivity, Biological, Physical (Heat etc.), Chemical). The measurements that gathered with the sensors are sent to the processor instantly and they are analyzed by the software. Then the information is transferred to the control center with the designated protocols.

The field factors of the system consist of telecommunication factors and central hardware-software and equipment.

Field Factors:
1. Containers (1) and Collection Centers:
   There are sensor groups, processor and control card (circuit?), wireless transfer card (circuit?) (Receiver-Transmitter (ISM band and other radio bands)) and-or modem, GPS positioning circuits, battery group, charge circuits, solar panel and other supply circuits.
2. Staff—Vehicle Equipment and Software:
   There is a wireless connection and a hand or vehicle terminal which can install the modem (3) and has a GPS modem (4) in it. There is a container that can gather the information from the collection vehicle and sensors groups and software or hardware (5) which are used in the collection center.

Telecommunication Factors:
GSM Network, Wi-Fi—Wimax Network, networks which can enable one way or multi-directional radio communications.

Central Factors:

Central Management, Query, Analysis, hardware (5) that runs the work flow, central data processing, components of registration and leading.

How the System Works:

Field System: System measures; the fullness of the collection centers and the collection vehicles which are in the containers (1) and locations, the fullness of the device's battery (10) and the situation of the power connection, the presence of the gases which can be a thread and/or their density, the intensity of the designated fragrance species, biological-chemical threads and their factors, the radioactivity level, the factors that would be needed in the narcotic and judicial procedures, vital symptoms with the help of the measurement system consists of poisonous gas sensor (6), fragrance sensor (7), volume-distance sensor (8) and other sensors (9) continuously or periodically. The obtained information are transferred to software (5) after they are classified by the processor (2) which is a unit of the central operations and the related processes are started.

Field System Sensors and Methods of Detection:

Detection of Fullness:

The measurement system of fullness is calculated by subtracting the measurable empty volume of the container from the recorded total volume of the container in the collection center or in the collecting vehicle. The measurement of the empty volume is executed by the area scanning or by the detection of the empty height. For scanning the full or empty area volume-distance sensor (8) is used. Volume-distance sensor (8) consists of ultrasonic, radar, laser and other distance measurement sensors.

To use that method, the pre-measured container (1) should be recorded to the central or field system processor unit or the container (1) that is going to be measured has to be measured and calibrated with the system when it is empty and the data, such as volume, height and weight, has to be recorded.

Detection of the Fragrance Emission and Separating the Factor-Material:

By recording to the system and calibrating the fragrance factor with the fragrance sensor (7), we can determine the annoying threshold in the ambient for a person or a society or closeness of the fragrance to that threshold and the type of the factor that creates the fragrance. Also with the molecule concentration measurement method poisonous-explosive gas detection can be provided with the help of the poisonous gas sensor (6). Fragrance measurement provides the information for separating the materials at the source, public health and its safety and defeating the threads, also the "urgent-privileged" information to work orders and collection plans for providing priority services.

Detection of Biological-Chemical Agents with the Other Sensors (9):

Biological sensors are used to detect biological agents in the ambient and in the air around the ambient. With the biological sensors, bacterial and viral pollution, control of the industrial waste water, protection of the environment and the control of the pollution, analysis of the toxic gas and military thread data can be provided to use in the processes.

Detection of the Radioactivity with the Other Sensors (9):

Detection of the radioactive materials in the ambient and its around is provided with the radioactive material detector which is integrated to the system. System measures the density of the radioactivity in the ambient.

With the system in the container (1), the radioactive factor is detected in the collection center and around, collection vehicles. Then the pre-defined processes is triggered.

Detection of the Vital Symptoms with the Other Sensors (9):

The detection of vital symptoms is provided with the infrared, heat, motion, sound sensors, thermal and normal cameras. Automatic detection can be done with the help of the operator or with the interpretation of the data from the sensor which is integrated to the system. So many processes can be started automatically according to interpreted data.

Detection of Stealing—Problem:

System can detect the stealing attempts and the problems with the factors like sudden power decrease or inconsistent data from the sensors. Then the detection of the problem process is started.

System Operation—Processes:

1. Instant Scene Processes

To start that process, the data triggers the factors in the environment or runs the alarm or any other detection factors on them, which is received from the direct connection on the field factor, radio receiver-transmitter or other connection protocols.

Trigger Mechanism a) Field factor can automatically trigger the alarms which are placed in the factor or around it according the classified information from sensors.

b) It gives information, warning and alarm to the staff and vehicle equipment. The visitation place-time notes are sent to center by the vehicle-staff information process unit to use in management.

c) The city observation and information system can make instant image detection and it can start the other alarms and warnings if any stealing attempts for containers and dangerous waste information are occurred.

2. Central Processes

To start the process, field factors can connect to the modem (3) which is placed in the vehicle-staff system or any other container-collection center placed nearby and they can transfer the classified information to central software (5), to the operator or to the city information system.

Those Processes a. Central software (5) or operator classifies the information depending on location, fullness ratio, information class and warning level which come from containers (1), collection centers and vehicles.

b. In the light of the classified information (Urgency, importance), vehicle-staff route planning can be made dynamically or manually with the benchmarks like vehicle-container fullness ratio, economical operation. Work orders are generated. The plan can be changed according to instant requirements.

c. In the work orders, work orders are transferred to the vehicle-staff information process unit according to the plan. Presence of the risk-thread factors and additional orders can be added to the work orders. Collection vehicles and staff can be watched to determine if they are completed the order.

d. Cross check can be done with GPS, the data which are obtained from base stations and other location detection technologies.

e. If any information is gathered which needs emergency actions (vital symptom, physical-biological-chemical thread, radioactivity) processes can be started by sending a warning message to other public systems and authorities f. By working with the city information system, the factors which are the source of the warnings can be detected with the image and other g. The data is recorded to use in further processes and analysis.

What is claimed is:

1. A waste measurement and tracking system comprising:
a waste container;
a waste collection vehicle;
a processor configured for central and field operations;
a first modem disposed in a vehicle-staff system or in the waste container, wherein said first modem is configured to transfer information to a central software, to an operator or to a city information system;
a GPS modem; and
a control and communication unit comprising software configured to save and transfer the information obtained from sensors attached on the waste container via elements of the control and communication unit;
wherein the sensors comprising:
a volume-distance sensor configured to scan occupied or empty areas of the waste container via an ultrasonic, a radar or laser measurement sensor;
wherein said processor is configured to store pre-measured total volume, height and width of the waste container when the waste container is empty, and wherein said processor is configured to calculate fullness of the waste container by subtracting a measured empty volume of the waste container, which is measured by and obtained from said volume-distance sensor, from the total volume of the waste container or by using data of empty height of the waste container, which is measured by and obtained from said volume-distance sensor.

2. The waste measurement and tracking system of claim 1, wherein the software of the control and communication unit is configured to save, analyze and trigger pre-defined processes to run a workflow.

3. The waste measurement and tracking system of claim 1, wherein the central software classifies the information depending on a location, a fullness ratio, an information class and a warning level which come from the container, collection centers and vehicles and in light of the information transferred from the first modem, wherein vehicle and staff route planning is performed dynamically or manually considering benchmarks of a vehicle and container fullness ratio, and operation economics.

4. The waste measurement and tracking system of claim 1, comprising a measurement system including a poisonous gas sensor, a fragrance sensor, and the volume-distance sensor.

5. The waste measurement and tracking system of claim 4, wherein the poisonous gas sensor detects a poisonous-explosive gas with a molecule concentration measurement.

6. The waste measurement and tracking system of claim 4, wherein the fragrance sensor determines with a molecule concentration measurement a threshold for a fragrance which is pre-calibrated and pre-recorded.

7. The waste measurement and tracking system of claim 4, wherein the fragrance sensor classifies materials in the container with a molecule concentration measurement.

8. The waste measurement and tracking system of claim 4, wherein the measurement system further comprises a radioactivity sensor, a biological sensor, a physical sensor, and a chemical sensor.

9. The waste measurement and tracking system of claim 4, wherein the processor is configured to classify sensor information obtained by the measurement system from the poisonous gas sensor, the fragrance sensor, the volume-distance sensor, the radioactivity sensor, a biological sensor, a physical sensor, and a chemical sensor, and the processor is further configured to transfer the classified sensor information to the software of the control and communication unit.

10. A method for waste measurement and tracking, comprising the following steps:
measuring an occupied area of a waste measurement and tracking container, wherein the waste measurement and tracking container comprises:
a control and communication unit comprising a processor, a modem, a GPS modem, and a software, and
a measurement system comprising a poisonous gas sensor, a fragrance sensor, and a volume-distance sensor;
the method further comprising
detecting a poisonous-explosive gas with a molecule concentration measurement;
detecting a fragrance factor;
detecting radioactivity, biological, physical and chemical factors;
measuring vital symptoms either continuously or periodically, using a poisonous gas sensor, a fragrance sensor, or a volume-distance sensor;
delivering data which exceed a critical threshold to a headquarters;
when it is impossible to deliver the data to the headquarters, delivering the data to a nearest transferring center; and
leading a nearest vehicle or staff to access the container to collect a waste.

* * * * *